United States Patent
Blackwell et al.

(10) Patent No.: US 9,342,567 B2
(45) Date of Patent: May 17, 2016

(54) CONTROL FOR PERSISTENT SEARCH RESULTS AND ITERATIVE SEARCHING

(71) Applicant: International Business Machines Corporation, Armonk, NY (US)

(72) Inventors: Jason M. Blackwell, Vestal, NY (US); Kevin Chiu, New York, NY (US); Claude J. Elie, Vestal, NY (US); Kimberly Knight, Salt Lake City, UT (US); Beverly M. Lovelace, Raleigh, NC (US); John E. MacDonald, IV, Apalachin, NY (US); Matthew Starr, Vestal, NY (US); Marc Wisniewski, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 13/974,788

(22) Filed: Aug. 23, 2013

(65) Prior Publication Data
US 2015/0058318 A1 Feb. 26, 2015

(51) Int. Cl.
*G06F 17/30* (2006.01)
*G06F 3/0481* (2013.01)

(52) U.S. Cl.
CPC ...... *G06F 17/30554* (2013.01); *G06F 3/04817* (2013.01); *G06F 17/30864* (2013.01)

(58) Field of Classification Search
USPC .......................... 707/722, 804–805, 765, 766
See application file for complete search history.

(56) References Cited

U.S. PATENT DOCUMENTS

| | | | |
|---|---|---|---|
| 7,519,580 B2* | 4/2009 | Blackwell | |
| 7,890,526 B1* | 2/2011 | Brewer | G06F 17/3097 707/767 |
| 7,908,260 B1 | 3/2011 | Bushee | |
| 8,041,701 B2* | 10/2011 | Amato | G06F 17/30864 707/707 |
| 8,209,314 B2* | 6/2012 | Blackwell | 707/706 |
| 8,359,306 B2* | 1/2013 | Kim | G06F 17/30864 707/708 |
| 2006/0190441 A1* | 8/2006 | Gross | G06F 17/30864 |
| 2006/0236216 A1* | 10/2006 | Blackwell | 715/500 |
| 2006/0282416 A1* | 12/2006 | Gross | G06F 17/30864 |
| 2007/0094241 A1* | 4/2007 | Blackwell et al. | 707/3 |
| 2007/0162422 A1* | 7/2007 | Djabarov | G06F 17/30646 |
| 2007/0192725 A1* | 8/2007 | Chen | G06F 9/4443 715/779 |
| 2007/0276803 A1* | 11/2007 | Shakib | G06F 17/30864 |
| 2008/0005292 A1* | 1/2008 | Vinberg et al. | 709/223 |
| 2009/0037406 A1* | 2/2009 | Blackwell et al. | 707/5 |
| 2009/0106241 A1* | 4/2009 | Blackwell | 707/5 |

(Continued)

OTHER PUBLICATIONS

Chen, S., et al., "Application of Hyperlinks Reproduction in Meta Search Resource Discovery," 2007.

(Continued)

*Primary Examiner* — Hanh Thai
(74) *Attorney, Agent, or Firm* — Cahn & Samuels, LLP

(57) ABSTRACT

An embodiment of the invention provides a method for control for persistent search results and iterative searching where a query from a user is received via a web browser and a web search for the query is performed with a processor. Search results of the web search are displayed in a toolbar of the web browser, wherein at least one of the search results in the toolbar includes a refinement option. The refinement option can include a show me more like this refinement option and/or a show me less like this refinement option. A selected refinement option is received from the user with a user interface; and, refined search results are displayed in the toolbar based on the selected refinement option.

11 Claims, 14 Drawing Sheets

(56) References Cited

U.S. PATENT DOCUMENTS

| | | | |
|---|---|---|---|
| 2011/0010357 A1* | 1/2011 | Kim | G06F 17/30991 707/708 |
| 2012/0284250 A1 | 11/2012 | Downum et al. | |
| 2013/0124496 A1* | 5/2013 | Edgar | G06F 17/30876 707/708 |
| 2013/0132357 A1* | 5/2013 | Edgar et al. | 707/706 |

OTHER PUBLICATIONS

Montereau, P D., "Primary, Secondary & Tertiary Sources," Jan. 2013.

* cited by examiner

CONTROL FOR PERSISTENT SEARCH RESULTS AND ITERATIVE SEARCHING

BACKGROUND

The present invention is in the field of systems, methods, and computer program products for control for persistent search results and iterative searching.

Classic internet search interfaces, such as those located at WWW.GOOGLE.COM, WWW.BING.COM, and WWW.YAHOO.COM, include a text box where a user can enter a keyword or keyword string (also referred to herein as "search term(s)" or a "query"). The user is presented with a list of search results. In some instances, search interfaces provide the user with controls to refine the search results. For example, e-commerce search interfaces often allow a user to filter search results by price, color, size, user rating, etc.

When a user clicks on a search result in the list of search results, the search results list is replaced by the selected search result. In some circumstances, this is an effective design. For example, when the user is seeking a single result, and that result appears at the top of the list, the user task is complete after two steps, i.e., entering a query and selecting the first search result.

SUMMARY OF THE INVENTION

An embodiment of the invention provides a method for control for persistent search results and iterative searching where a query from a user is received via a web browser and a web search for the query is performed with a processor. Search results of the web search are displayed in a toolbar of the web browser, wherein at least one of the search results in the toolbar includes a refinement option. The refinement option can include a show me more like this refinement option and/or a show me less like this refinement option. A selected refinement option is received from the user with a user interface; and, refined search results are displayed in the toolbar based on the selected refinement option.

An embodiment of the invention provides a method including identifying a web page displayed in a browser with a monitoring device. At least one attribute of the identified web page is identified with an analyzer. A web search for the at least one identified attribute is automatically performed with a processor; and, results of the web search are displayed in a toolbar of the browser.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a method of control for persistent search results and iterative searching, which reduces the inefficient "back and forth" web browsing between the search results page and individual search results. The method can enable users to make search refinements when viewing the actual detail of result pages and provides persistent and dynamic search results that are not user initiated. The method shifts the focus from what the experience should be on the search results page to what the experience should be when actually viewing a search result in detail.

An embodiment of the invention includes persistent search results and refinement controls (with a small footprint) while users are actually viewing content. This also means search results related to the viewed content can be offered without the user deciding to search or even formulating a query. For example, products from competitor websites could be automatically displayed when the user is viewing a product page, thereby alleviating both the need to decide to search and the need to formulate or reformulate/revise a query.

At least one embodiment displays the search results in a search toolbar that is "docked" at the top (illustrated, for example, in FIG. 1), bottom, or side of the user's browser. Toolbars can offer the ability to execute a keyword search, quicklinks to certain content (e.g., email applications or news websites), and/or actions to take with the currently displayed page (e.g., sharing via social sites, translating the page).

The toolbar can provide a persistent display of the search results (result previews) that make the results of a search available even after a result has been opened. In one embodiment, the toolbar recommends search results even when the user has not actively conducted a search (e.g., shows pages related to the page currently being viewed). The toolbar can also perform actions on the search results to help the user refine a search or to allow the user to take action with the target web pages, and functions that allow the user to take action with several results at once, instead of one result at a time. The toolbar can provide tools that help the user construct a productive query, specifically by interacting with the page being viewed. Instant search functions can be provided that allow the user to quickly execute searches, especially searches related to the content being viewed.

Figure 1:
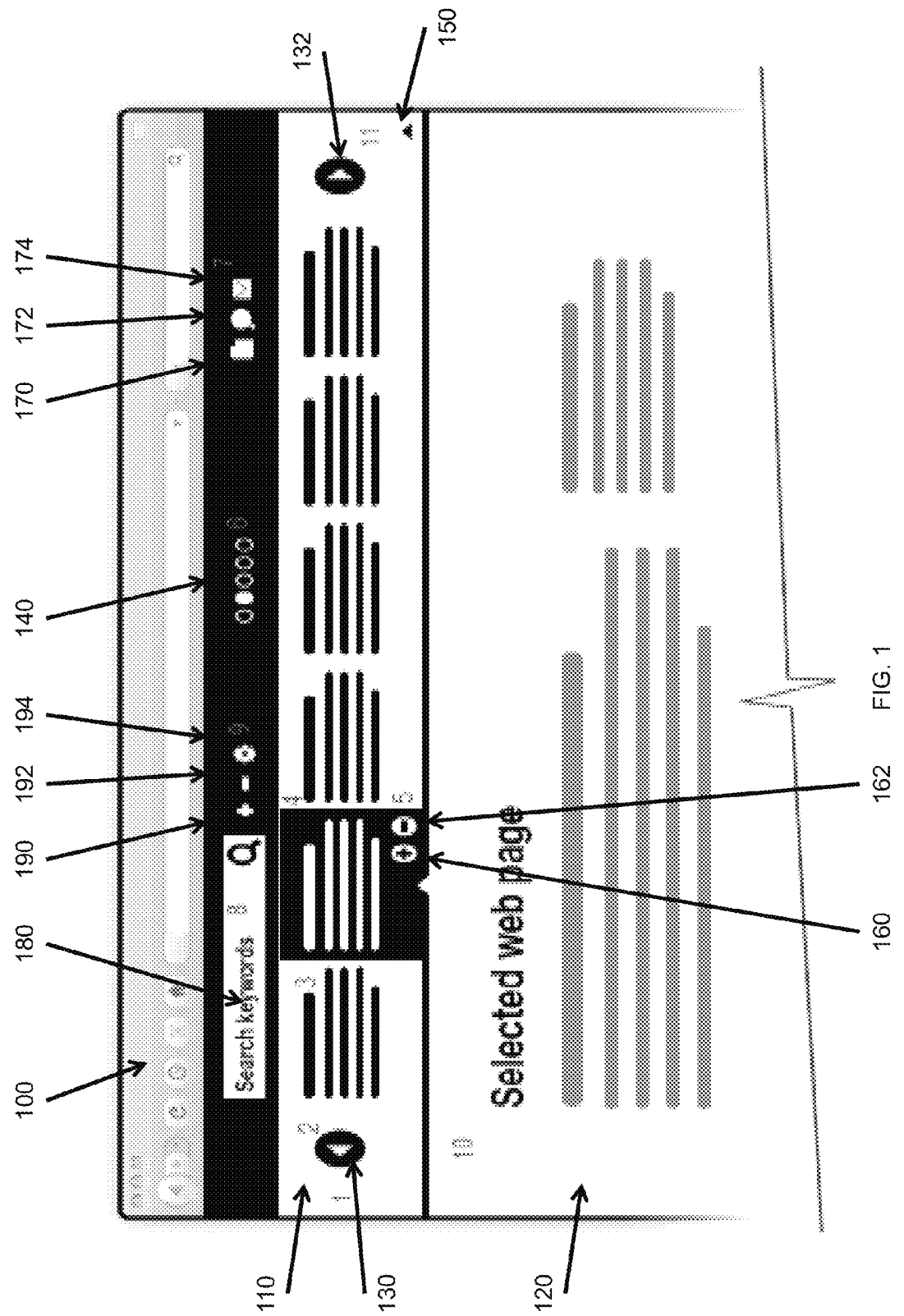
FIG. 1 illustrates a browser including a search toolbar according to an embodiment of the invention.

FIG. 1 illustrates a browser 100 including a search toolbar 110 according to an embodiment of the invention. A user can use the toolbar 110 or a search website (e.g., WWW.GOOGLE.COM) to perform an internet search, wherein the search results are displayed in the toolbar 110. The user can open a particular search result (shown as "Selected web page" 120) and scroll through the results like a carousel. More specifically, the user scrolls through the search results using the scroll icons 130, 132 and page through the search results using the page icons 140. In FIG. 1, the second search result on the second page is displayed in the browser 100. The hide icon 150 allows the user to hide the toolbar 110.

In this fashion, even though the user has opened a single search result, multiple search results are still available for referral. This makes it easier for users to view multiple results from the combined results set. When multiple results are displayed after an initial result is opened, opening two results can be accomplished by clicking the first result (page load) and clicking the next result (page load). This saves both a Back button click and a page reload. The more results viewed, the greater the time/effort savings.

The form of the search results in the toolbar 110 can vary. In FIG. 1, the search results are illustrated as hyperlink and/or text excerpts. In another embodiment, the search results could include thumbnail images of the target pages (e.g., with zoom/pan features). In at least one embodiment, the search results are illustrated as hyperlink and/or text excerpts and thumbnail images of the target pages. The search results can be contextually responsive to the type of search being conducted. For instance, a search for products can show a product image with the price superimposed. Since results and content can be displayed in the same space, the results list can be kept small so it does not disrupt content viewing. Allowing the results display to be variable (e.g., contextually responsive to the type of content being viewed) allows the system to be customized based upon user task.

In at least one embodiment of the invention, the search result(s) in the toolbar 110 include refinement icons 160 and 162, wherein selection of the refinement icon 160 ("+") on a select search result refines the search by displaying web pages that are more like the select search result, and wherein selection of the refinement icon 162 ("−") on a select search result refines the search by displaying web pages that are less like the select search result. In the embodiment illustrated in FIG. 1, the search results display the refinement icons 160 and 162 when the search result is selected by a user. In another embodiment, where the search results are consumer products, selection of the icon 160 adds the select search result, for example, to the user's "cart". Thus, the browser 100 allows a user to select and take action upon multiple results as opposed to one result at a time. The browser 100 can also include icons 170, 172, and 174, wherein icon 170 adds a selected search results to a bookmark folder, icon 172 shares a selected search results via instant messaging and/or a social networking website, and icon 174 shares a selected search results via e-mail. The browser 100 can include other icons (not shown), for example, an icon to open selected search results in different tabs, or refining a search by selecting multiple search results and clicking on an icon to indicate that the user would like to view more results similar to the selected set. The toolbar 110 includes a text box 180 where text can be entered to perform a search, wherein the text box 180 stays in synch with the most recent search conducted, i.e., the search results displayed in the toolbar 110 correspond to the text shown in the text box 180.

Figure 2:
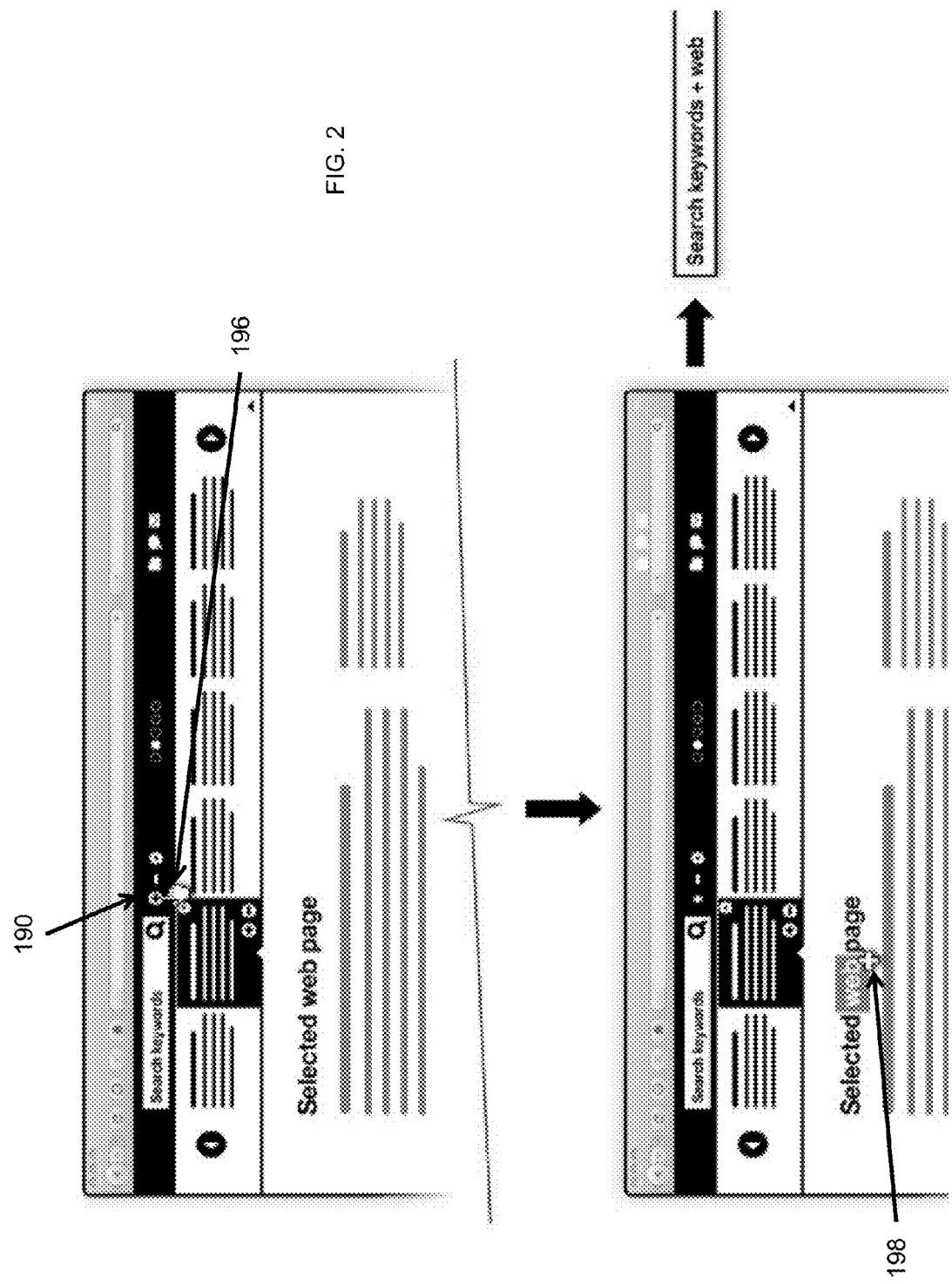
FIG. 2 illustrates a browser with query assistance according to an embodiment of the invention.

The browser 100 can provide the user with assistance in constructing effective queries (or performing an instant search) based upon content currently being viewed. For example, as illustrated in FIG. 2, if a user clicks on the icon 190, the mouse pointer 196 changes to a plus ("+") to indicate a new mode. Then, the user can select content on the currently displayed web page 120 with the mouse pointer 198, and the selected content can be added to the search string (i.e., in the text box 180) or a new search can be instantly performed and the search results are updated (i.e., in the toolbar 110). Multiple words could be added to the text box 180 by clicking, holding, and dragging content/terms into the text box 180 from the web page 120.

In at one embodiment, this feature is not limited to text. For example, the user can click on a picture and get image results similar to the selected picture, or via object recognition get web pages related to the item depicted in the selected picture. Any recognizable object on the web page 120 (e.g., hyperlinks, dates, currency, applets) are candidates for this function.

Thus, the user is given search results (or given help constructing a query) for content without having to construct the query all on their own. An embodiment of the invention also offers assistance in constructing Boolean searches. For example, the minus ("−") icon 192 can be used by the user to exclude search results from the toolbar 110 with the clicked content objects. Specifically, the user can click on the icon 192 and select items in the web page 120 using the mouse pointer to exclude from the query. A quotes control can allow the user to select exact phrases.

Figure 3:
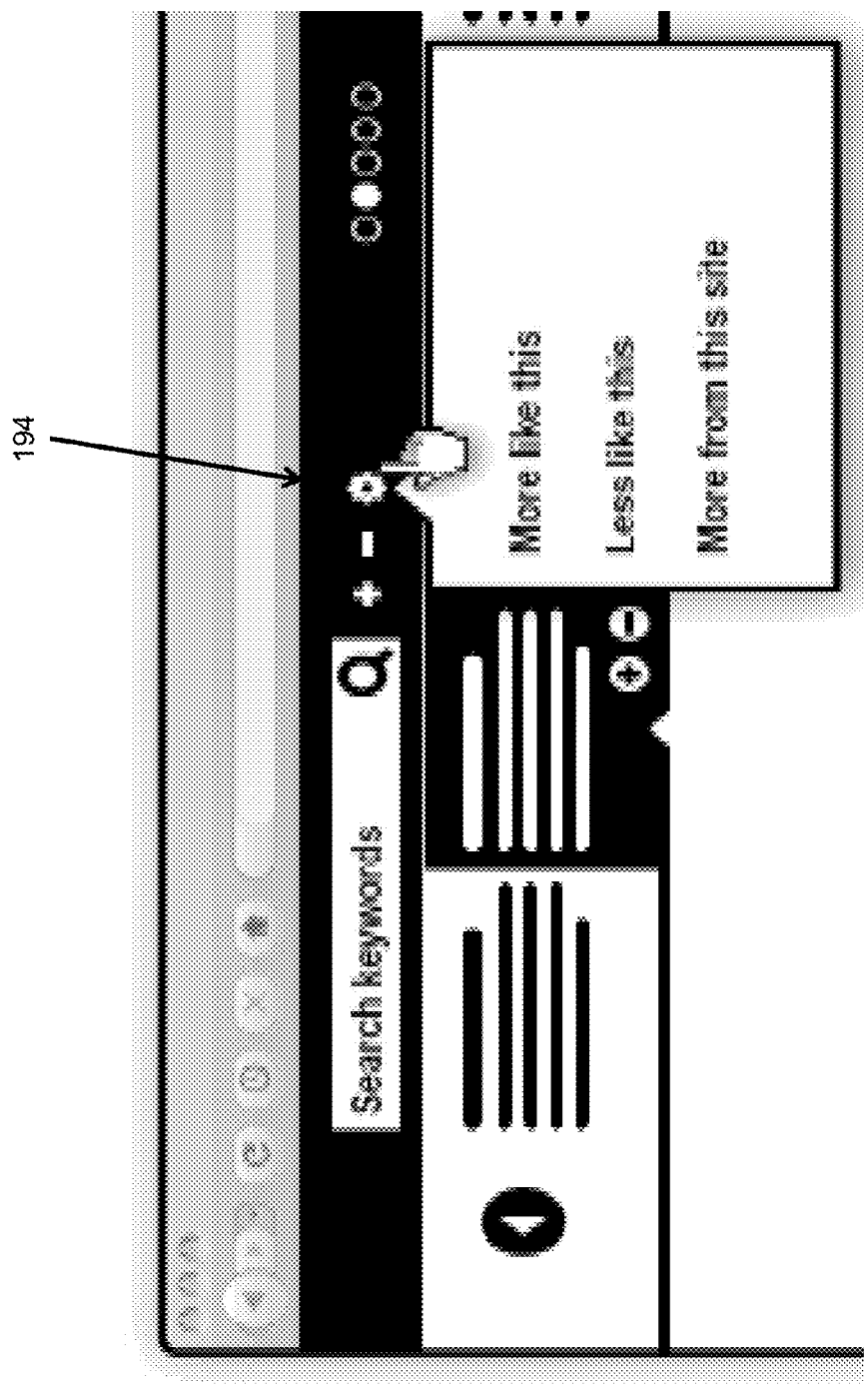
FIG. 3 illustrates a browser with a search update icon according to an embodiment of the invention.

In addition to these controls, a number of "instant search" options could also be offered. As illustrated in FIG. 3, clicking on the icon 194 allows the user to update the search results to all be similar to the web page currently being displayed 120 ("More like this") or less like the web page currently being displayed 120 ("Less like this"). Another instant search option provides search results matching the keywords, but the search results are limited to web pages from the displayed web site 120 ("More from this site"). Instant search controls can also be shown/hidden that are contextually customized to the content being viewed. For example, if the user is viewing a web page with information about a hotel, the browser 100 can offer "Other nearby hotels" options (e.g., using hotel address and radius around that address). Because the browser 100 offers results, refinement, and content in the same space, this can be highly effective for users. It can cue the user to search by showing/hiding instant search options, give users results related to their current page with a single click with no need to construct a query, and allow the users to browse search results without leaving the page that they are viewing.

In addition to single-click instant searches, the toolbar 110 can provide automatic search results. While the scenarios above involve active searches (i.e., the user decides to execute a search), the toolbar 110 can also provide reactive searches. That is, the user can leave the toolbar 110 open while he or she browses the web, the toolbar 110 can automatically provide recommended web pages related to the displayed web page 120. For example, if the user is viewing a product on an e-commerce web site, the toolbar 110 can provide web pages for the same product from other e-commerce web sites. In this fashion, the toolbar 110 can save the user money even when it never occurred to the user to check other e-commerce web sites.

Likewise, the browser 100 can have dedicated space that always displays related content from a certain source (e.g., a space that shows products from XYZ manufacturer and information related to the web page currently being viewed). This could help increase revenue streams to the target company. Furthermore, the automatic results in the toolbar 110 do not have to be limited to being related to the current web page 120. The automatic results in the toolbar 110 can also be reactive to all web pages viewed in a browsing session, user characteristics, general web history, and more. In this way, not only is a user provided with automatic results with no effort on their part, but the quality of results may be improved by reflecting all of the user's browsing.

Accordingly, the browser 100 can provide a persistent display of search results (result previews) and enable automatic search results to be displayed even when the user has not actively conducted a search. Actions on the search results can be provided to help the user refine a search or to allow the user to take action with the target web pages. Moreover, functions are provided that allow the user to take action with several results at once, instead of one result at a time. Tools are also provided that help the user construct a query, specifically by interacting with the web page being viewed. Instant search functions can allow the user to quickly execute searches, especially searches contextually related to the content being viewed. Furthermore, the toolbar 110 enables the user to view search results without leaving the current web page or while browsing through web pages.

The search results can be generated either via an active search initiated by the user or via automatic searches performed as the user browses web pages. This can eliminate the need for a user to construct a query. Query-building assistance can be provided to help the user in conducting active searches. Functions are also provided for group processing of search results (e.g., the ability for the user to specify that he or she wants more results similar to the selected search results). These features assist users in tasks which process multiple, rather than single, search results.

The functionality of the web browser can be called upon or initiated in several ways. For instance, a user can initiate a web search from a dedicated web search page (e.g., WWW.GOOGLE.COM, WWW.BING.COM) and after the user opens a result, the criteria and results are carried over into the toolbar. This enables the search results to continue to be displayed while the user is viewing a clicked result. On the other hand, the user can initiate a web search from the toolbar. There is no requirement to go to a dedicated web search page. In addition to initiating a web search, the user can also modify a web search (initiated from either a web search page or the toolbar) and receive search results within the toolbar. In at least one embodiment, the user can take the search results from the tool bar and choose to return to a full page search results view. In another embodiment, the user receives search results related to the task they are doing without any explicit action.

The general form of the control (also referred herein as the "toolbar") can have many variations. In one instance, the control is a docked, persistent part of the user's browser (e.g., a toolbar). In another example, the control is a toolbar extension, where search result are shown below the toolbar (e.g., with a show/hide feature for the previews of the search results).

In another example, aspects of the invention are built into a search results page (e.g., using Javascript or other approaches). Thus, when a user opens a search result, the control is automatically inserted at the top of the web page above the content. In another example, the control is a floating, "always on top" widget that is separate from the browser. Furthermore, the control can be customized by the user (e.g., the control is a floating widget that automatically switches to the docked variation when the user drags it to the edge of the browser).

Figure 4:
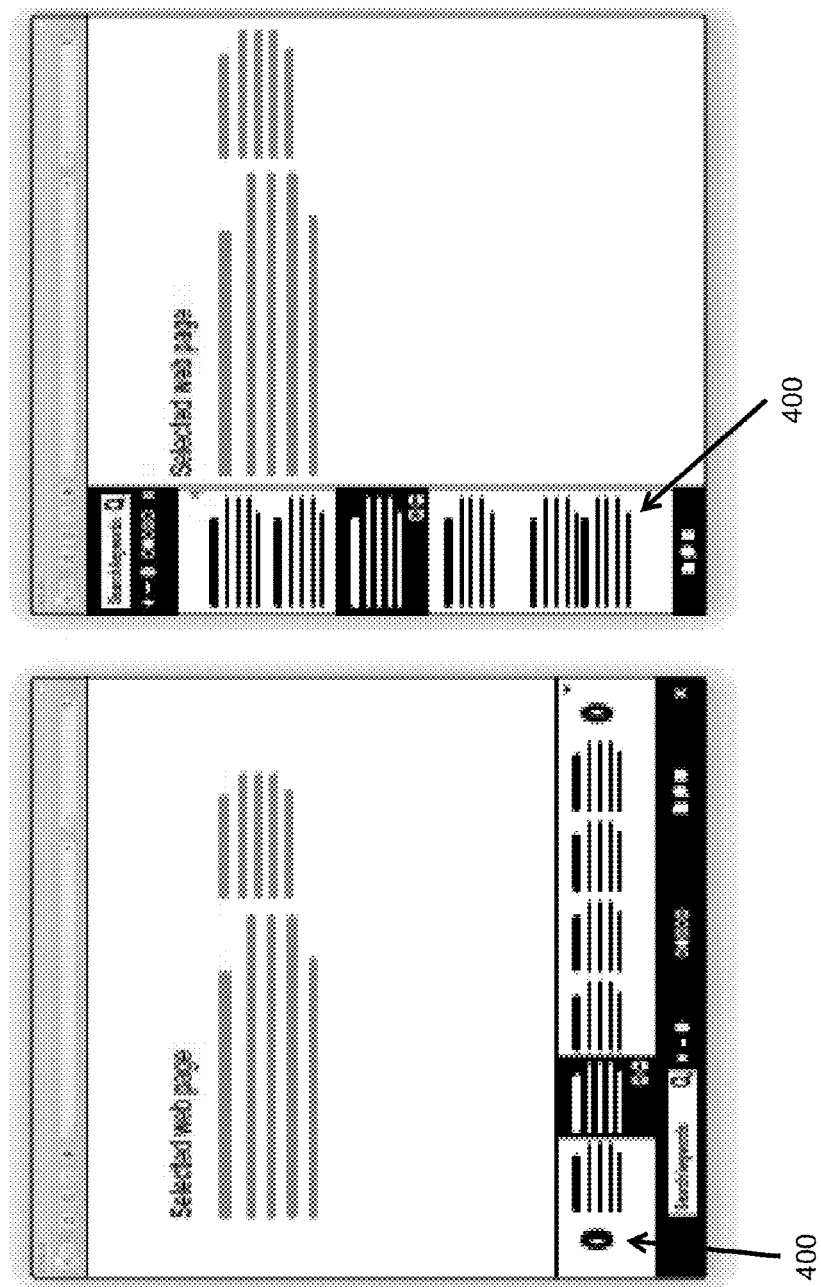
FIG. 4 illustrates a first and second browser with docked controls according to an embodiment of the invention.

The position of the control can also vary and can be customized by the user. For the docked variation, the control 400 can be placed at the top, bottom, left, or right of the screen. See FIG. 4. For a floating widget, the control can be anywhere the user drags it.

While the example embodiments described herein are a part of the user's web browsing/searching experience, the control is not limited to this space. For example, many desktop applications have search utilities (e.g., for searching help topics), and the control can be applied to these spaces as well.

The control persistently displays search results. In other words, the search results are always available to the user as they are browsing web pages. These search results (also referred to herein as "previews") can be the results of a user conducting an active search. These previews can also be displayed after the user employed a dedicated search page. Thus, the user might do a search using XYZ.COM search engine, and the control can persist those XYZ.COM results. In another embodiment, the previews are populated using an automatic search process that displays previews as the user browses the web. The previews can show results that a search engine has determined are similar to the web page currently being viewed.

Search result previews can be a scrolling list of links and abstracts, as can be seen in search result interfaces (e.g., WWW.BING.COM, WWW.YAHOO.COM). However, there are many alternatives that the user might find more functional. For instance, the search results can include images/thumbnails of the target web page. These could be arranged in a carousel control that allows the user to easily scroll through choices and make selections. In addition to images of the target page, the search results can reflect the type of search being conducted. For example, if images are being searched for, then image thumbnails can be provided as results previews. If consumer products are being searched, the search results can show product images with the price prominently superimposed on the image. The search results can also include advertisements from sponsors appropriate to the web page being viewed and/or the terms being searched.

The type of search result preview that is displayed can be controlled automatically by the system or by user preference. For example, if the user is viewing a web page with a consumer product on it, the reactive search can show search result previews that show a picture of the product, the price, and the ability to buy the product.

The search results section can also include sorting controls appropriate to the item type being displayed. For example, for consumer products, the user can sort the search results by price or average consumer rating.

Figure 5:
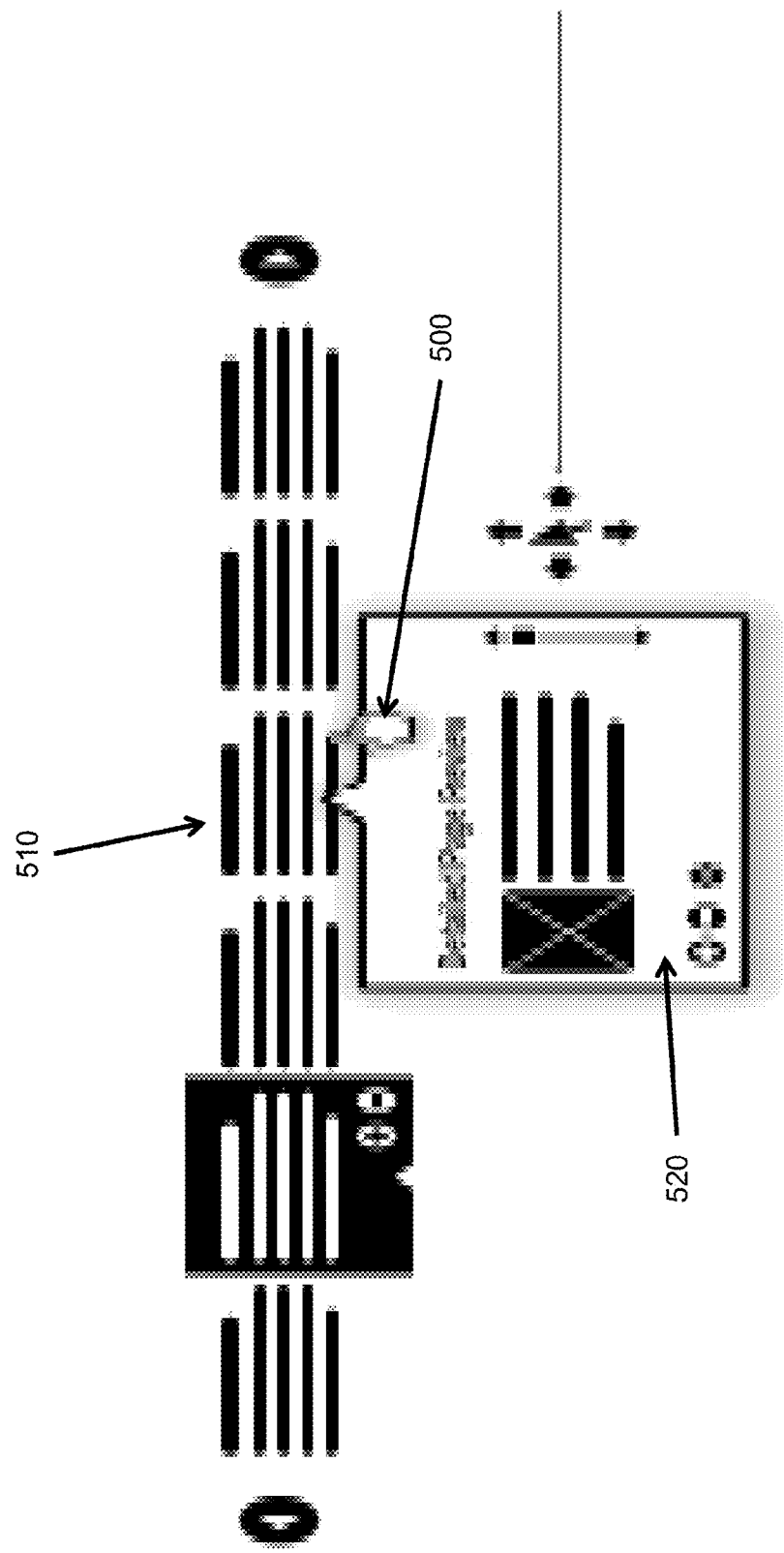
FIG. 5 illustrates a toolbar according to an embodiment of the invention.

The control can be relatively small with respect to the browser and/or displayed web page. As illustrated in FIG. 5, hovering the mouse pointer 500 over a search result 510 can auto-zoom, pan, or provide an alternate summary of the search result 520. For example, when the user hovers the mouse pointer over a search result thumbnail, a textual abstract is provided for the search result in, for example, a pop-up window.

There are a number of ways for a user to open a search result shown in the preview section of the toolbar. For instance, the user can click the search result to have the target web page load into the browser. Double clicking on the search result or right-clicking on the search result and opening the web page from a context menu can also load the web page into the browser. Additionally, the user could employ a drag-and-drop technique by dragging the search result preview to the content space in the browser; or, dragging the search result preview to the browser's tab bar could open the web page in a new tab.

Figure 6:
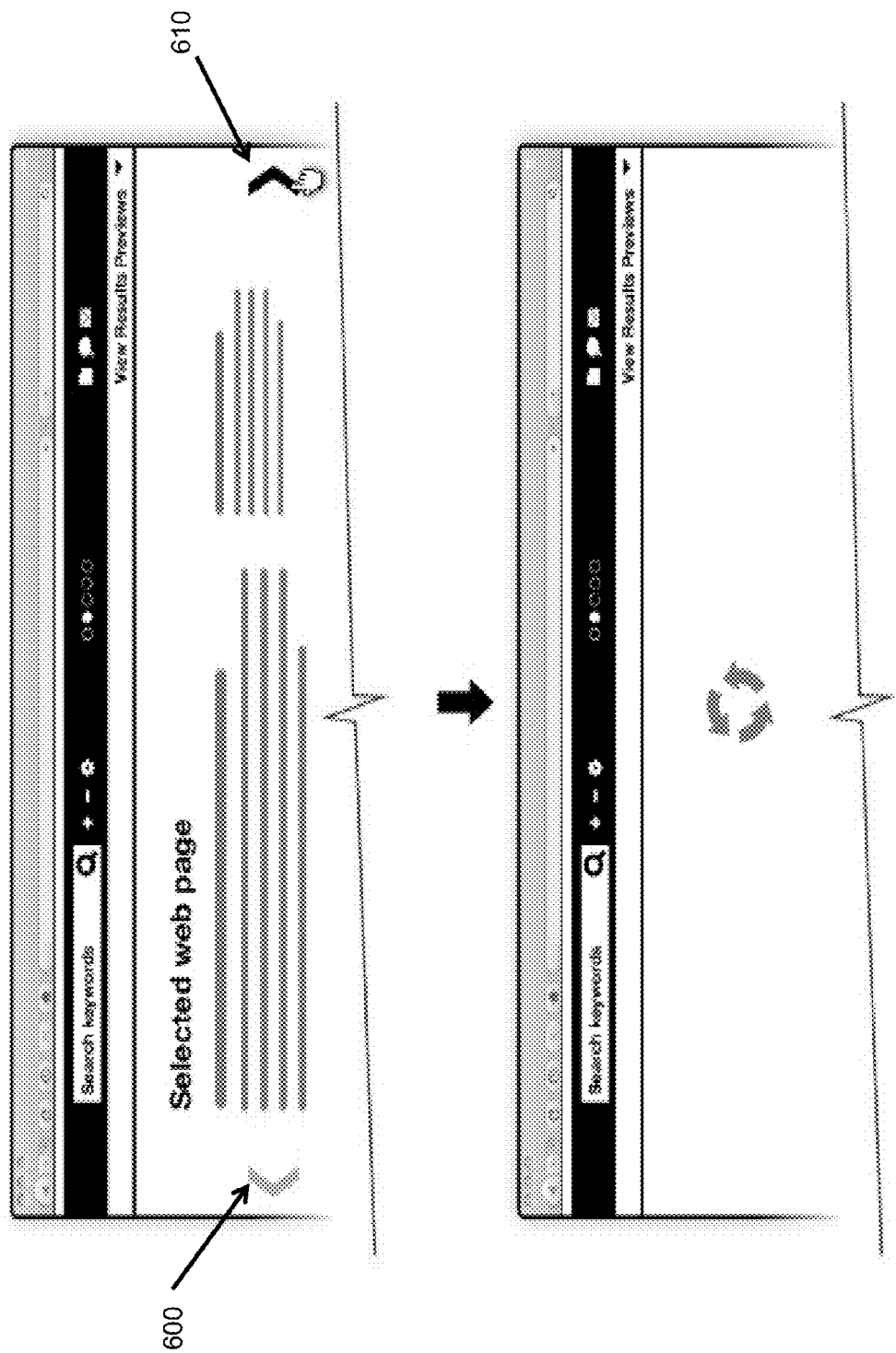
FIG. 6 illustrates paging control icons in a web browser according to an embodiment of the invention.

In addition, the user can use paging control icons (e.g., "<" and ">" buttons) which allow the user to move to the next or previous search result (or to the next similar page, if no active search was conducted). As illustrated in FIG. 6, paging control icons 600 and 610 can be displayed even when the search previews are hidden. In this fashion, users can move to a web page which the search system has determined is similar to the web page being viewed without performing an active search or without viewing search result previews.

Figure 7:
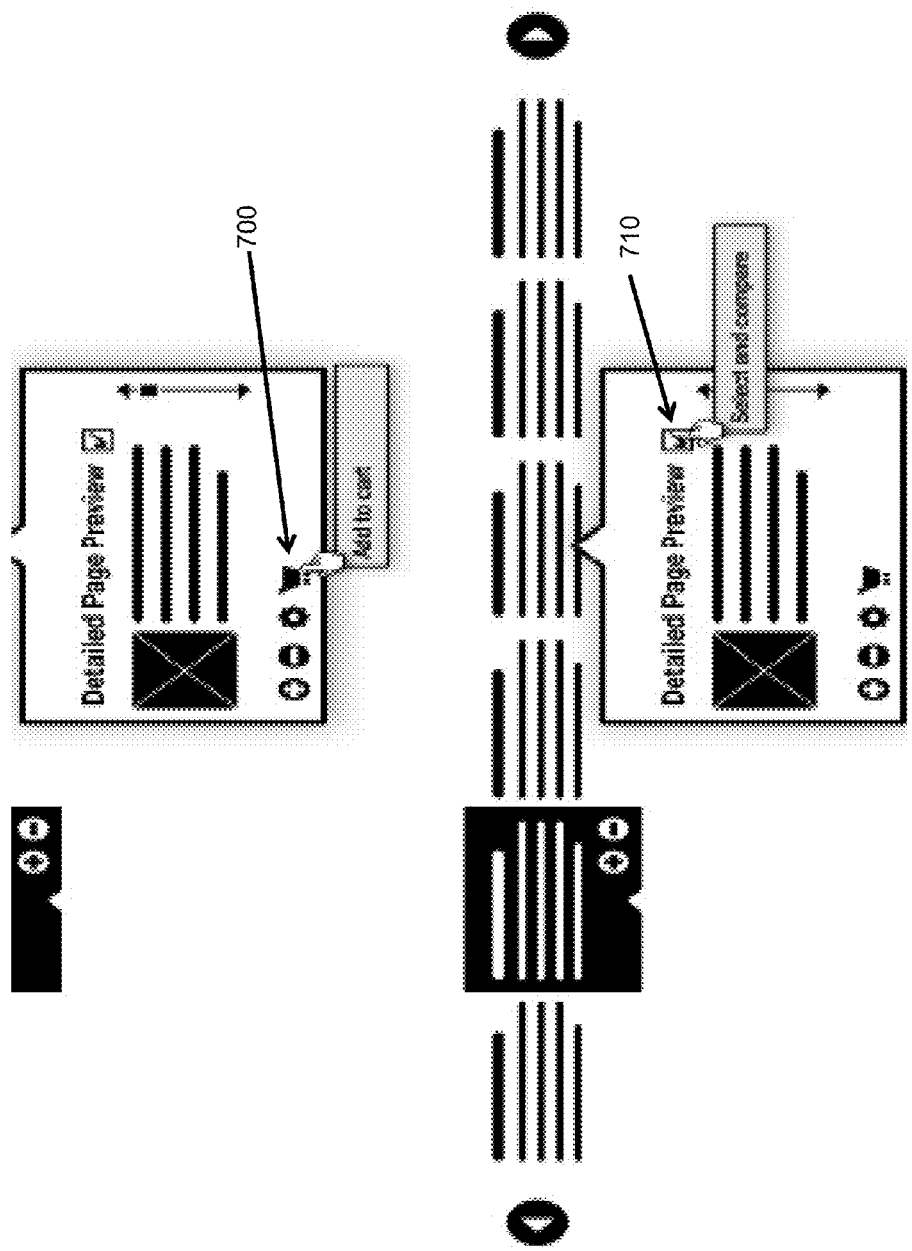
FIG. 7 illustrates action icons in a web browser according to an embodiment of the invention.

Actions can also be placed on the search result previews themselves. For example, a "more like this" link or button is displayed on a target search result preview that allows the user to refresh the search results with previews similar to the target search result preview. A "fewer like this" refinement can also be available on the target search result preview. Additionally, as illustrated in FIG. 7, action icons unique to the size and/or type of search result preview being displayed can be provided. For example, a product search result preview includes an icon 700 that initiates adding the product to an on-line shopping cart. A checkbox or similar control 710 can also be added to the search result previews for selecting multiple search result previews for group actions/processing.

Figure 8:
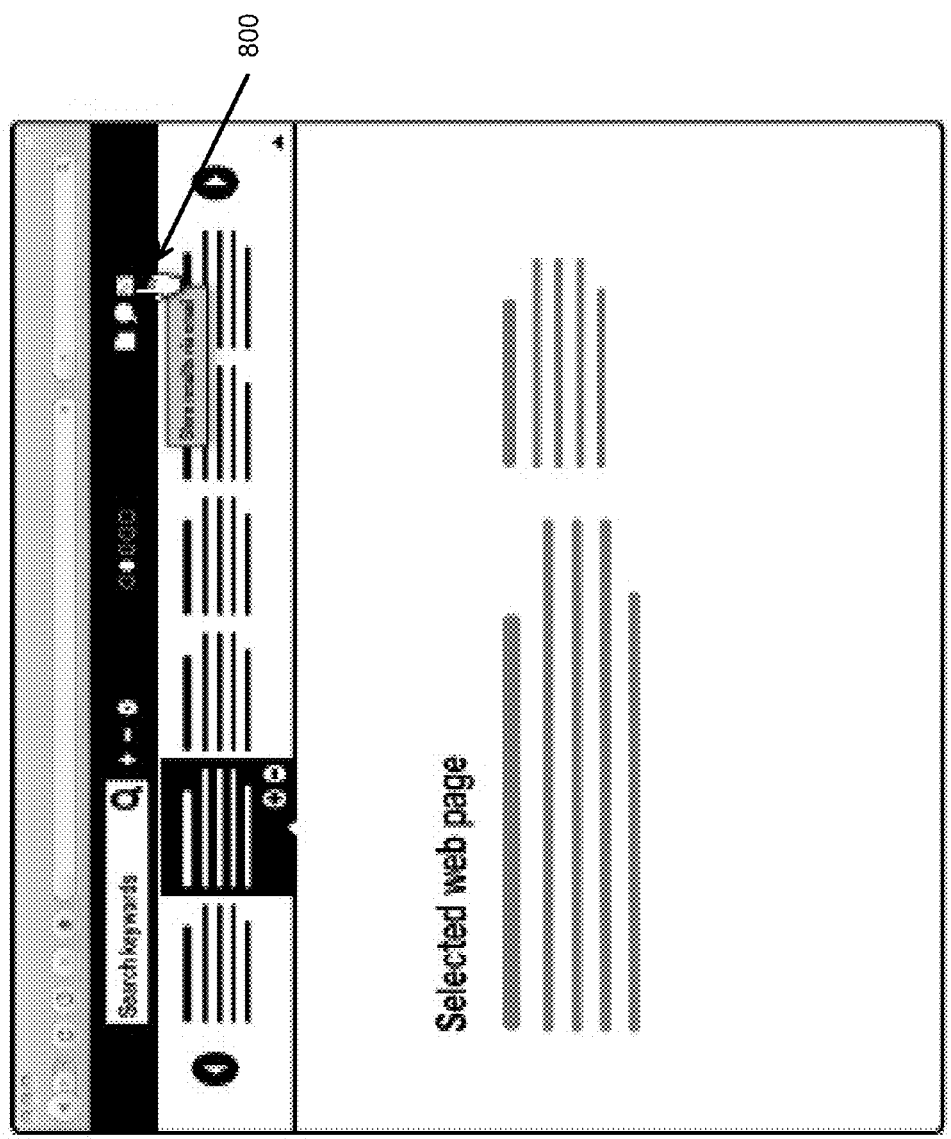
FIG. 8 illustrates and icon for sharing search results according to an embodiment of the invention.

Selecting multiple search result preview allows the user to take action on the selected search result previews via displayed action icons. For example, an icon is provided to add all of the selected search result previews to a new browser bookmark folder. Another icon can open all of the target search result items in new tabs in the web browser. As illustrated in FIG. 8, an icon 800 can be provided for sharing the search results with other users (e.g., via e-mail, instant messaging, social networks). Actions can be specific to the types of search result previews being displayed. For example, an icon is provided to display a table comparing the features of selected product search result previews (e.g., price, average customer rating, size, etc.).

In at least one embodiment of the invention, a text box is provided to allow the user to enter keywords and construct Boolean search strings. The search is executed using a button or by the user pressing the <Enter> key. The search results are shown in the previews section of the toolbar, wherein the toolbar can include an indicator to signify when an active search has been conducted by the user versus when an automatic search was performed by the system. The text box can persist the search most recently conducted. Therefore, even if the user conducts a web search via a search page (e.g., WWW.YAHOO.COM), the text box is updated to reflect the web search that the user conducted on that search page.

Figure 9:
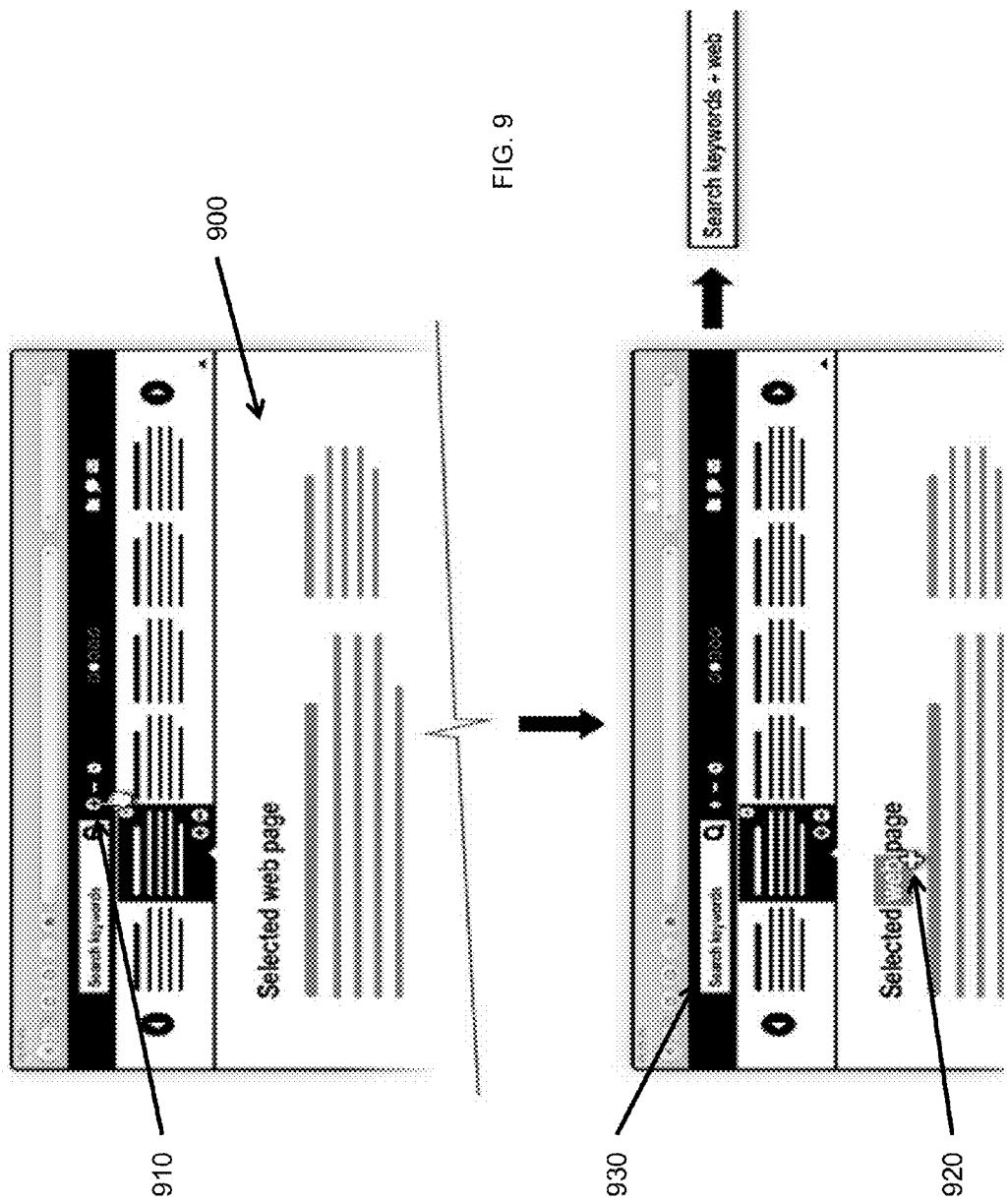
FIG. 9 illustrates point and click query construction with a mouse pointer according to an embodiment of the invention.

The text box can allow the user to construct a query and execute searches via point-and-click query construction. For example, the text box includes a control to add terms to the query (e.g., illustrated with a plus sign "+") and a control to exclude items from the search (e.g., a minus sign "−"), and a control to include exact matches (e.g., quotes " "). The user can click on the plus sign control to change the mouse pointer (e.g., to a plus sign). The user can now click on content items with the mouse pointer to add the items to the query. For example, as illustrated in FIG. 9, if the user is viewing a web page 900 with the term "web" in the text, then when in this mode clicking on the plus sign control 910 and then on "web" in the web page 900 with the mouse pointer 920 causes the word "web" to be added to the search string in the text box 930. Multiple words or phrases could be added by holding the mouse button and swipe selecting multiple words.

Figure 10:
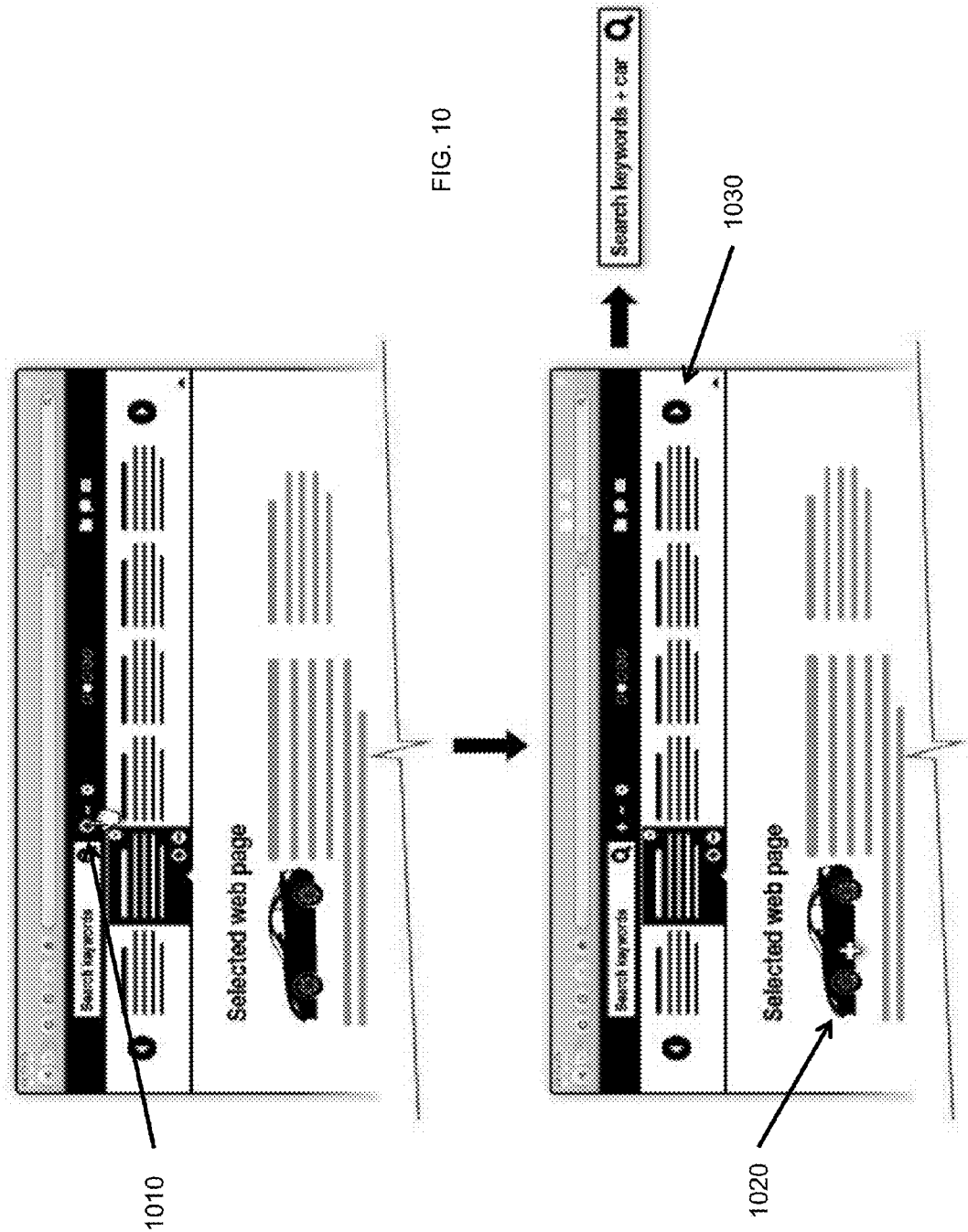
FIG. 10 illustrates an object recognition search according to an embodiment of the invention.

In another embodiment of the invention, rather than adding words to the text box with the mouse pointer, the browser can be configured to instantly search on items clicked with the mouse pointer. In yet another embodiment, the user clicks on an image on the web page with the mouse pointer to obtain image search results similar to the image clicked. In still another embodiment, object recognition is used to provide search results related to the object clicked on. For example, as illustrated in FIG. 10, clicking on the plus sign control 1010 and an image of a car 1020, the toolbar presents the user with search result previews 1030 related to "car".

Any recognizable object on a web page is a candidate for this interaction. Hyperlinks (e.g., show results for web pages similar to the target page), formatted/tagged data (e.g., dates, currency), embedded code/applications/applets (e.g., clicking a Shockwave game could provide more games as search results) and more are possibilities. The above examples illustrate the "add to search" feature. Likewise, a user can click on the minus icon ("−") and select text or content to exclude from the search. Or, a quotes control (" ") could be selected to add exact phrases to the search.

The toolbar area that has query construction tools can also offer other buttons that refine the search based upon the content being currently viewed. Referring back to FIG. 3, a "More like this" button can provide search results similar to the web page being viewed when executed. Selection of the "More from this site" button instantly provides search results matching the search query but scoped to the web site for the web page being currently viewed. Selection of the "Less [or fewer] like this" control provides search results similar to the original search, but different from the web page currently being viewed. For example, if the user searches for the term "plane" and opens a search result that shows a wood working tool, selection of the "Less like this" button can provide search results similar to "plane" but excluding the woodworking tool (e.g., provide results that match the geometric or aircraft meaning of "plane"). Thus, the toolbar allows for one-click execution of search refinement, and does so while the user is viewing the relevant content.

The buttons/options displayed in the toolbar can be contextually reactive to the content being viewed. For example, a user viewing a web page having information about a hotel is offered a control to search for other hotels near the hotel being viewed. Thus, instant search controls can be displayed and hidden based upon the content being viewed.

Options displayed in the toolbar can include the ability to "Enable automatic search results". As described above, the browser could provide "automatic" searching, i.e., conduct searches even when the user has not decided to search. Thus, search results/previews can be displayed persistently while the user is viewing web pages. The toolbar can provide search result that include previews of web pages related to the web page being currently viewed. For example, a user viewing an e-commerce web page with a product is shown search result previews that include the same product from competing e-commerce sites. This enables the user, at a glance, to know what deals other e-commerce sites are offering for the same product, even if it never occurred to the user to do an active search (let alone requiring the user to construct a query).

In another embodiment, the toolbar offers automatic web search results that are personalized to the user based upon the user's browsing history. The user's actions (e.g., search results clicked on) can also be used to feedback into and improve the search algorithms. Search result previews can be refined by all of the web pages that the user has viewed during a browsing session, how long the user viewed each web page, whether the web page was scrolled by the user, the hyperlinks clicked on the web page by the user, etc.

At least one embodiment of the invention ensures that the user can discriminate between active search results and automatic search results. This can be accomplished by providing a visual queue (e.g., a different background color for search results that were automatically generated), offering the user a control to switch between the two types of search results, automatically switching to active search results when the user performs an active search (and "locking" those results as the user browses them), and/or offering user preferences/customization as to whether automatic search results are offered.

Figure 11:
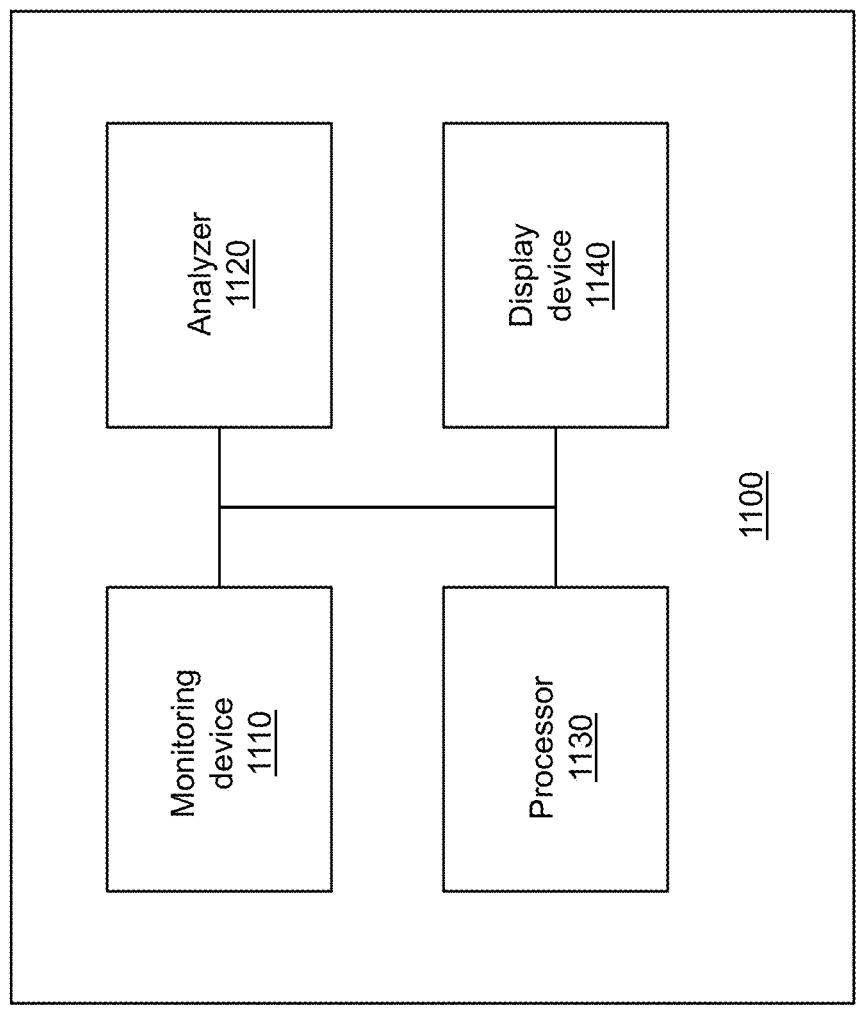
FIG. 11 is a diagram illustrating a system for persistent search results and iterative searching according to an embodiment of the invention.
Figure 12:
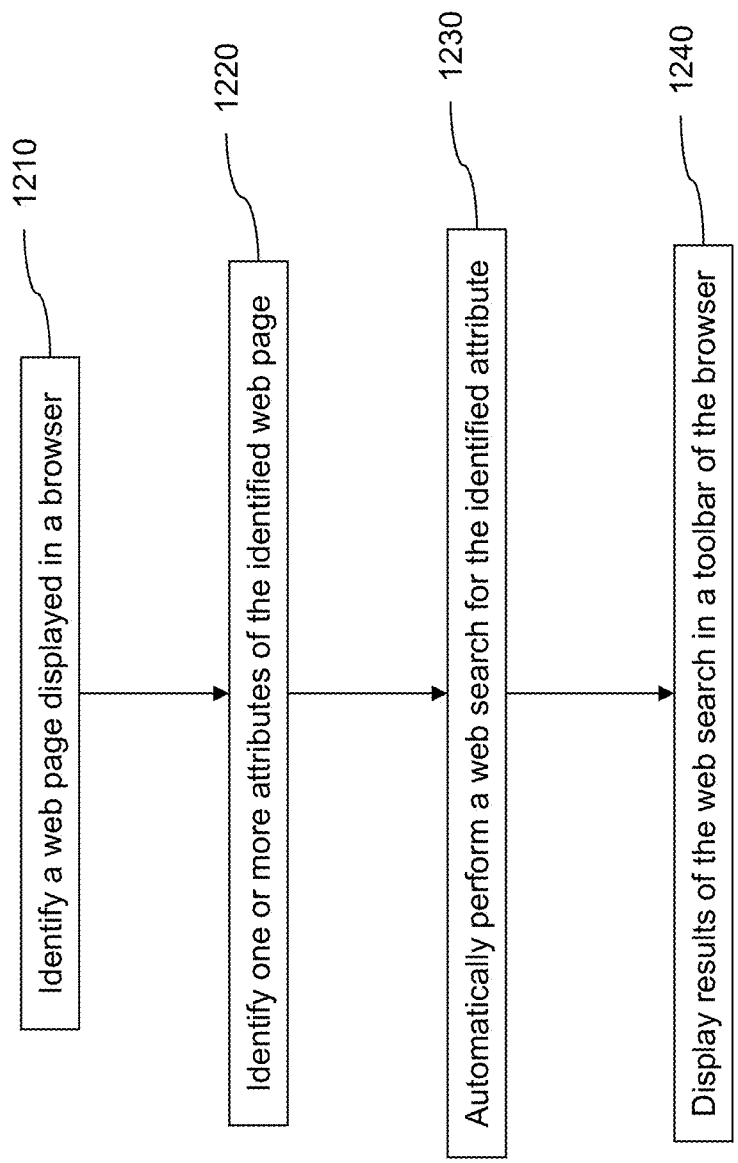
FIG. 12 is a flow diagram illustrating a method for control for persistent search results and iterative searching according to an embodiment of the invention.

FIG. 11 is a diagram illustrating a system 1100 for persistent search results and iterative searching according to an embodiment of the invention. The system 1100 includes a monitoring device 1110, an analyzer 1120, a processor 1130, and a display device 1140. FIG. 12 is a flow diagram illustrating a method for control for persistent search results and iterative searching according to an embodiment of the invention (for example, using the system 1100). A web page displayed in a browser is identified with the monitoring device 1110 (1210); and, one or more attributes of the identified web page are identified with the analyzer 1120 (1220). For example, the monitoring device 1110 identifies that a shoe store's web page is displayed in the browser; and, the analyzer 1120 identifies that the web page includes work boots (i.e., attributes). As used herein, the term "monitoring device" includes a computer hardware component that identifies a web page; and, the term "analyzer" includes a computer hardware component that is connected to the monitoring device. As used herein, the term "connected" includes operationally connected, logically connected, in communication with, physically or wirelessly connected, engaged, coupled, contacts, linked, affixed, and attached.

The processor 1130 automatically performs a web search for the identified attribute (1230). In at least one embodiment, the web search is automatically performed without user input other than the original selection of the web page (e.g., via selection of a hyperlink in search results, via entry of a URL). Results of the web search are displayed on the display device 1140, more specifically, in a toolbar of the browser (1240). The web page and the toolbar are simultaneously displayed in the browser. As used herein, the term "processor" includes a computer hardware component that performs web searches for attributes; and, the term "display device" includes a computer hardware component (e.g., a laptop monitor) that is connected to the processor.

In at least one embodiment of the invention, the monitoring device 1110 identifies web pages in the browser history for a predetermined time period (e.g., current session), and the analyzer 1120 identifies one or more attributes of the identified web pages in the browser history. For example, it is determined that a user has been browsing web pages for rain jackets. The processor 1130 can automatically performing a second web search for the identified attribute(s); and, the results of the second web search (e.g., web pages including rain jackets) can be displayed in the toolbar of the browser.

The method can further include receiving a selection of one or more of the search results based on user input (e.g., checkbox, control button and mouse click), wherein an action on the selected search result(s) are performed in response to the selection of an action icon on the toolbar. The action can include sharing the selected search result(s) via e-mail, instant message, and/or via a social networking website, adding the selected search result(s) to a bookmark folder, and/or opening the selected search result(s) in a new tab in the browser. In another embodiment, the action includes refining the search based on the selected search result(s), wherein the refining includes searching for web pages on the web that are more like the selected search result(s), searching for web pages on the website currently displayed in the browser that are like the selected search result(s), or searching for web pages on the web that are less like the selected search result(s).

Another embodiment of the invention identifies an item selected in the browser by the user, the selected item including text and/or an image. For example, the user uses the cursor (also referred to herein as a "mouse pointer") to select an image of a wrist watch. In another example, the user uses the "Shift" and arrow keys to select the text "watches". The selected item is then added to the query. In another embodiment, the mouse pointer is changed to a plus symbol (i.e., "+") in response to selection of an automatic search icon on the toolbar by the user. An item selected in the browser by the user with the plus symbol is identified, the selected item including text and/or an image. The web is automatically searched for the selected item. In yet another embodiment, an item selected in the browser by the user is identified, the selected item including text and/or an image; and, the query is refined by excluding the selected item from the query.

Figure 13:
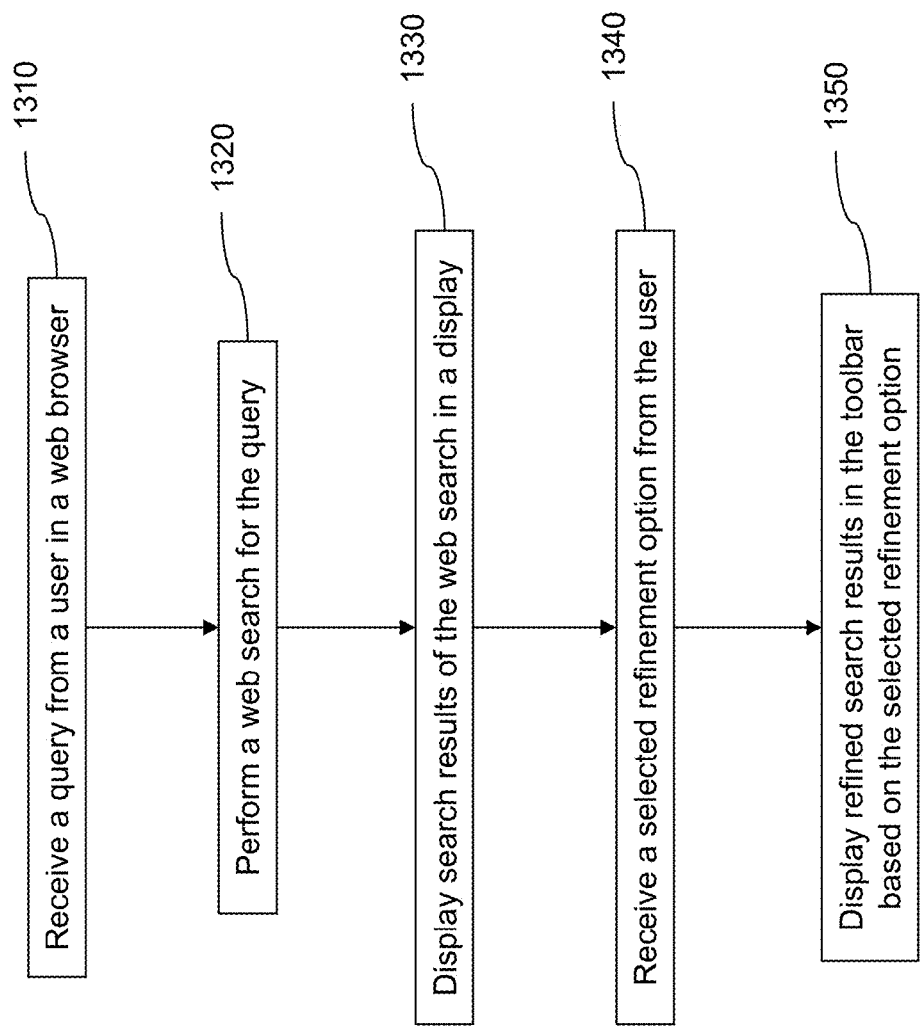
FIG. 13 is a flow diagram illustrating a method for control for persistent search results and iterative searching according to another embodiment of the invention.

FIG. 13 is a flow diagram illustrating a method for control for persistent search results and iterative searching according to another embodiment of the invention (for example, using the system 1100). A query from a user is received in a web browser of a desktop computer or a mobile device, wherein the query is received via a user interface (e.g., mouse, keyboard, touchscreen) (1310). The query can be received in the toolbar or via a web page (e.g., GOOGLE.COM) in the web browser.

A web search for the query is performed with a processor (1320); and, search results of the web search are displayed in a display device (e.g., laptop monitor, tablet computer screen) (1330). Specifically, the search results are displayed in the toolbar of the web browser, wherein one or more of the search results in the toolbar include a refinement option. The refinement option can include a show me more like this refinement option or a show me less like this refinement option. Each of the search results in the toolbar can include a hyperlink to a web page and a preview of the web page. The preview can include a textual summary, an image summary, and/or a thumbnail image of the web page.

A selected refinement option is received from the user with the user interface (1340); and, refined search results are displayed in the toolbar based on the selected refinement option (1350). In at least one embodiment, a web page is displayed in the web browser (e.g., in response to the user selecting a search result from the toolbar), wherein the web page and the search results of the query (in the toolbar) are displayed simultaneously in the web browser.

In addition, at least one embodiment of the invention receives a selection of one or more of the search results in the toolbar based on user input, and performs an action on the selected search result(s) in response to the selection of an action icon on the toolbar. Specifically, the action can include sharing the selected search result(s) via e-mail, instant message, and/or a social networking website, adding the selected search result(s) to a bookmark folder, and/or opening the selected search result(s) in a new tab in the browser. In another embodiment, the action includes refining the search based on the selected search result(s), the refining including searching for web pages on the web that are like more the selected search result(s), searching for web pages on the website currently displayed in the browser that are like the selected search result(s), and searching for web pages on the web that are less like the selected search result(s).

In at least one embodiment, an item selected in the browser by the user is identified, the selected item including text and/or an image. The selected item can be added to the query or excluded from the query. In another embodiment, a mouse pointer in the browser is changed to a plus symbol in response to selection by the user of an automatic search icon on the toolbar. An item selected in the browser by the user with the plus symbol is identified, the selected item including text and/or an image. The processor can automatically search the web for the selected item.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 14:
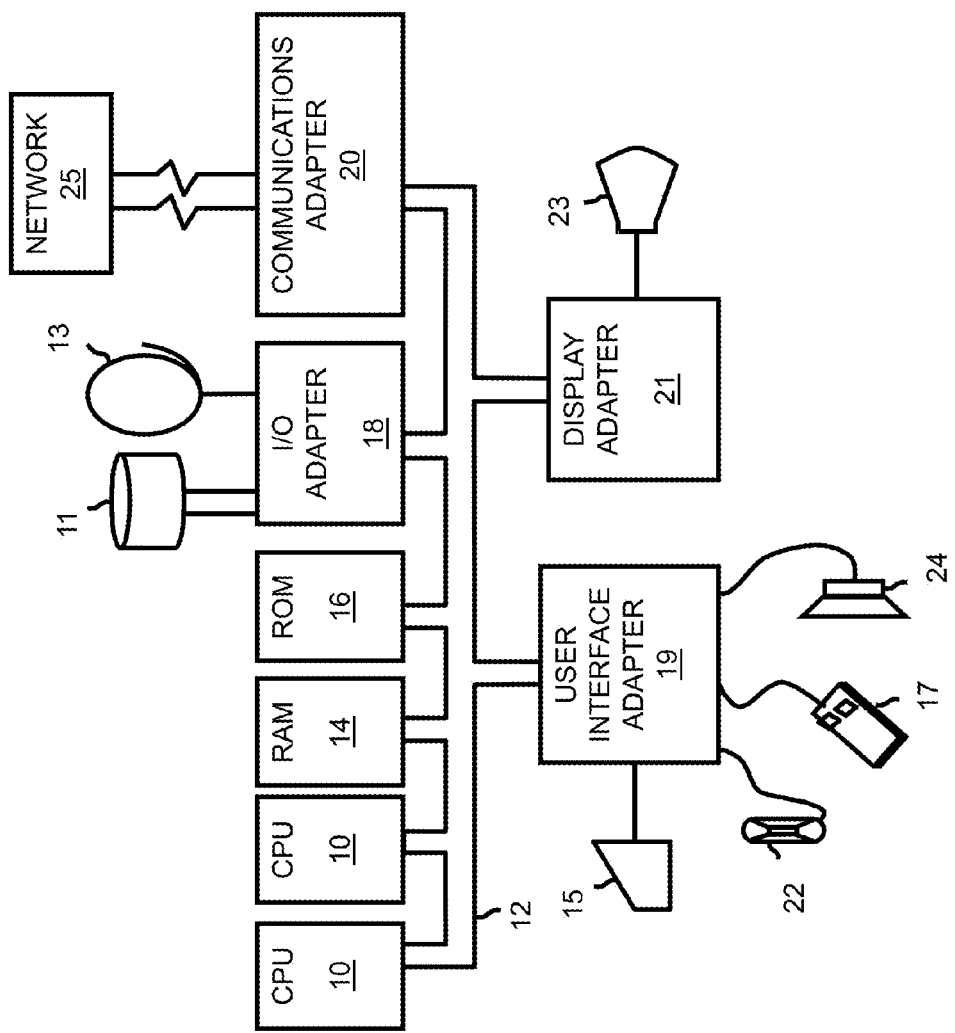
FIG. 14 illustrates a computer program product according to an embodiment of the invention.

Referring now to FIG. 14, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 12 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving a query from a user in a web browser;
   performing a web search for the query with a processor;
   displaying search results of the web search in a toolbar of the web browser, at least one of the search results in the toolbar including a refinement option, the refinement option including at least one of a show me more like this refinement option and a show me less like this refinement option;
   receiving a selected refinement option from the user with a user interface; and
   displaying refined search results in the toolbar based on the selected refinement option.

2. The method according to claim 1, further comprising displaying a web page in the web browser, wherein the web page and the search results of the query are displayed simultaneously in the web browser.

3. The method according to claim 1, further comprising:
   receiving a selection of at least one of the search results in the toolbar based on user input;
   performing an action on the at least one selected search result in response to a selection of an action icon on the toolbar.

4. The method according to claim 3, wherein said performing of the action includes sharing the at least one selected search result via at least one of e-mail, instant message, a web application, and a website.

5. The method according to claim 3, wherein said performing of the action includes adding the at least one selected search result to a bookmark folder.

6. The method according to claim 3, wherein said performing of the action includes opening the at least one selected search result in a new tab in the browser.

7. The method according to claim 3, wherein said performing of the action includes refining the search based on the at least one selected search result, said refining including one of:
   searching for web pages on the web that are more like the at least one selected search result,
   searching for web pages on the website currently displayed in the browser that are like the at least one selected search result, and
   searching for web pages on the web that are less like the at least one selected search result.

8. The method according to claim 1, further comprising:
   identifying an item selected in the browser by the user, the selected item including at least one of text and an image; and
   adding the selected item to the query.

9. The method according to claim 1, further comprising:
   changing a mouse pointer in the browser to a plus symbol in response to selection of an automatic search icon on the toolbar;
   identifying an item selected in the browser by the user with the plus symbol, the selected item including at least one of text and an image; and
   automatically searching for the selected item.

10. The method according to claim 1, further comprising:
    identifying an item selected in the browser by the user, the selected item including at least one of text and an image; and
    refining the query by excluding the selected item from the query.

11. A computer program product comprising:
    a non-transitory computer readable storage medium;
    first program instructions to receive a query from a user;
    second program instructions to perform a web search for the query;
    third program instructions to display search results of the web search in a toolbar of the web browser, at least one of the search results in the toolbar including a refinement option, the refinement option including at least one of a show me more like this refinement option and a show me less like this refinement option;
    fourth program instructions to receive a selected refinement option from the user; and
    fifth program instructions to display refined search results in the toolbar based on the selected refinement option,
    wherein said first program instructions, said second program instructions, said third program instructions, said fourth program instructions, and said fifth program instructions are stored on said computer readable storage medium.

* * * * *